Sept. 18, 1962

R. LUCIEN 3,054,582

COMBINED JACK AND SHOCK-ABSORBER DEVICE
FOR AIRCRAFT LANDING GEAR

Filed May 19, 1959

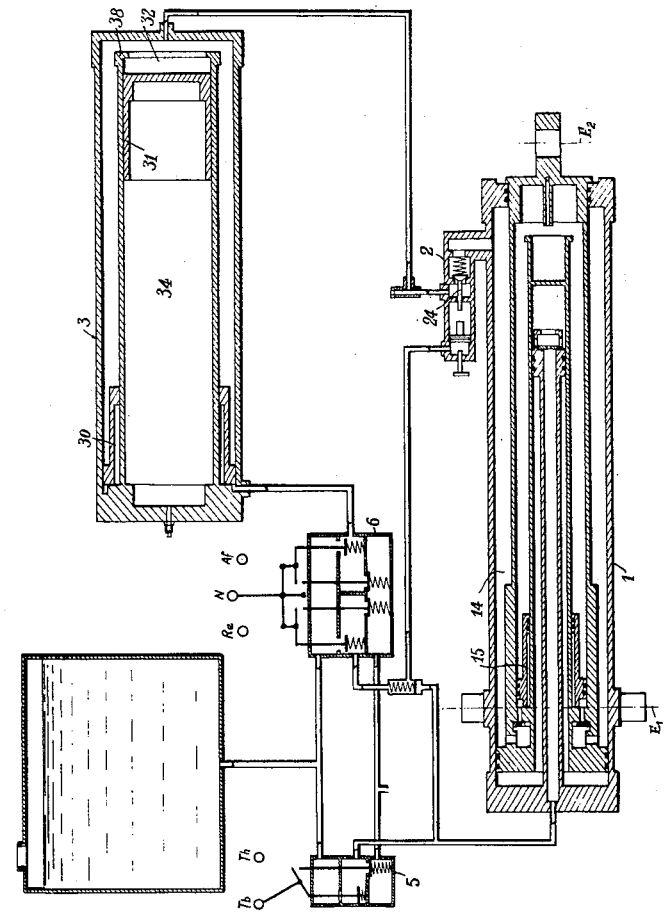

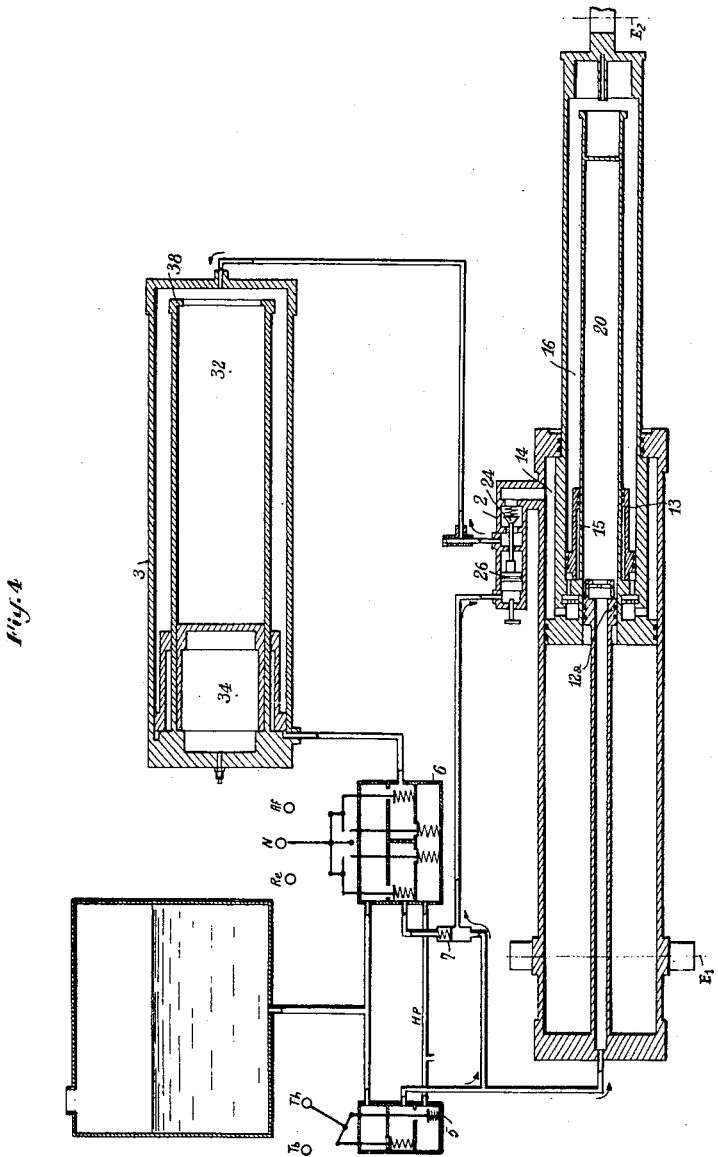

Sept. 18, 1962
R. LUCIEN
3,054,582
COMBINED JACK AND SHOCK-ABSORBER DEVICE
FOR AIRCRAFT LANDING GEAR
Filed May 19, 1959
7 Sheets-Sheet 5
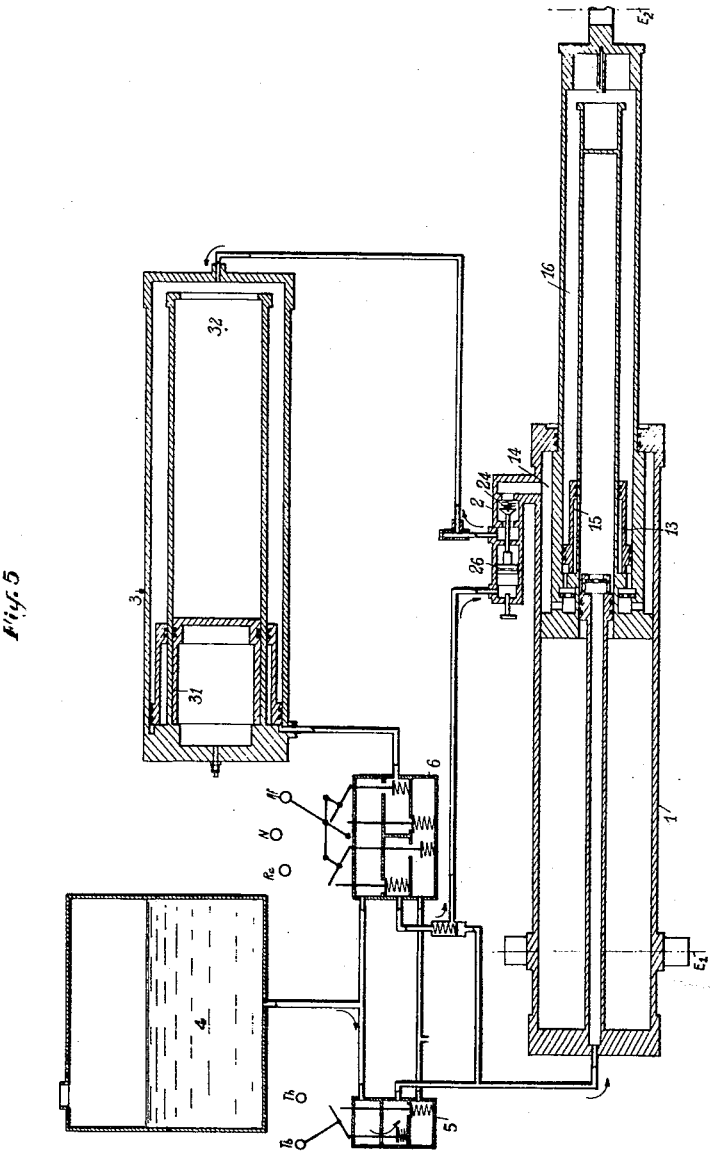

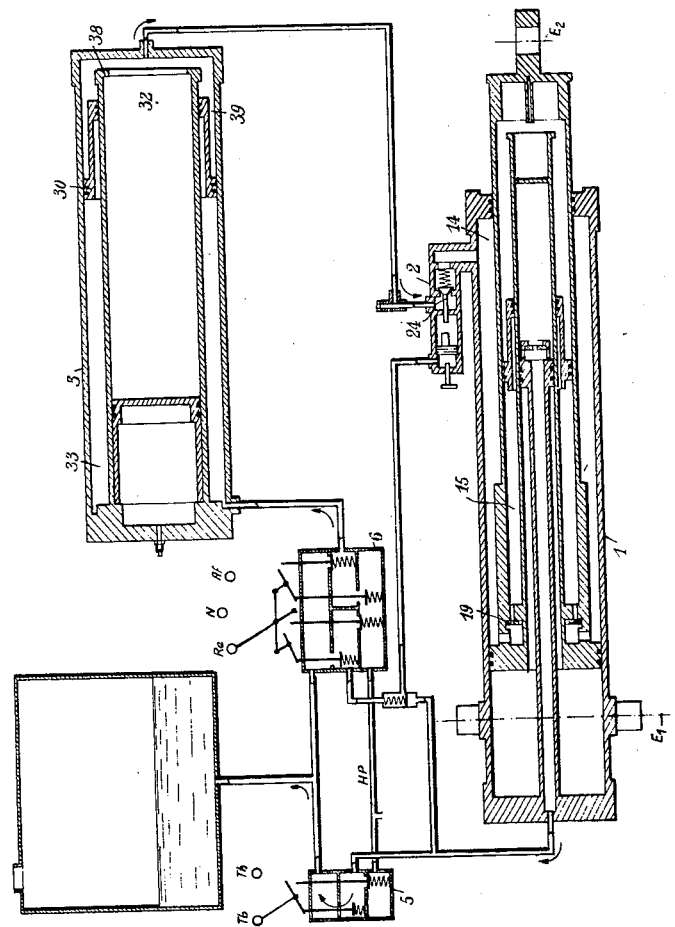

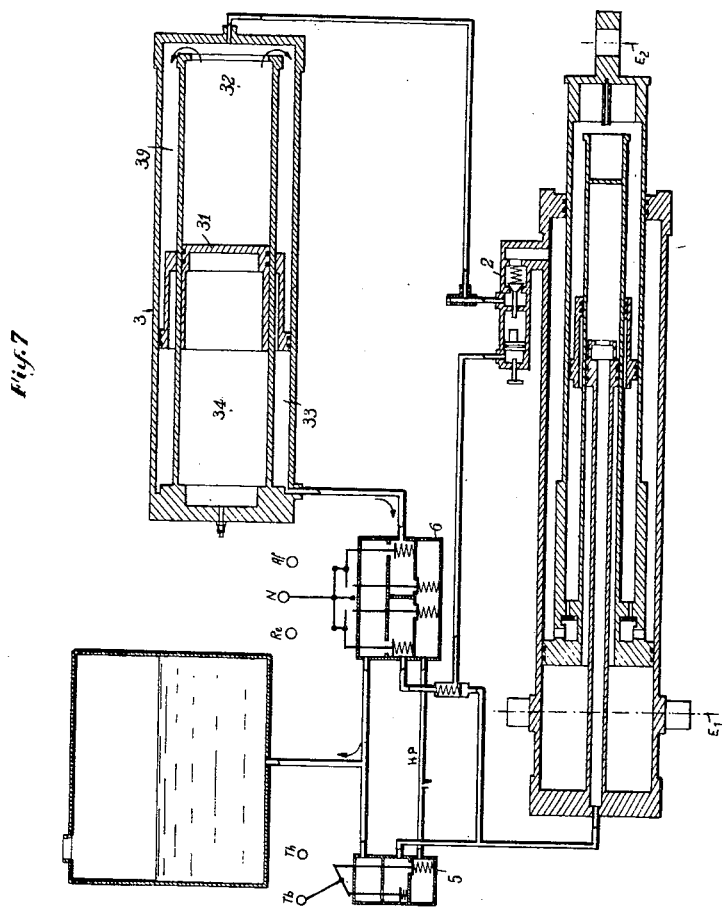

United States Patent Office 3,054,582
Patented Sept. 18, 1962

3,054,582
COMBINED JACK AND SHOCK-ABSORBER DEVICE FOR AIRCRAFT LANDING GEAR
René Lucien, Neuilly-sur-Seine, France, assignor to Recherches Etudes Production R.E.P., Paris, France, a corporation of France
Filed May 19, 1959, Ser. No. 814,338
Claims priority, application France June 7, 1958
5 Claims. (Cl. 244—104)

This invention relates to landing gears for aircraft and the like.

An object of the invention is to provide an improved combined jack and shock-absorber device for aircraft landing gear, said landing gear being capable of carrying out the following different functions using the same elements:

Shock-absorber function (absorption of energy in the course of landing or running on the ground;

Lifting-jack function for retracting the under-carriage into the aircraft in flight;

Position-changing function for the purpose of modifying the trim of the aircraft on the ground (for example lowering of the fuselage for loading).

Although it is not limited to this application, the invention can be applied with advantage to the landing gear described and illustrated in my co-pending patent application Ser. No. 813,153 filed on June 6, 1958, for "Aircraft Landing Gear With Tandem Wheels."

In order to make it more clearly understood, the device in accordance with the invention will be described below with respect to the landing gear of the above-mentioned application.

The device according to the invention is represented and illustrated by FIGS. 2 to 7 of the accompanying drawings in which:

FIG. 1 diagrammatically illustrates the device according to the invention as connected to the landing gear of the above mentioned application;

FIG. 3 represents the condition corresponding to the aircraft in flight;

FIG. 4 represents the condition corresponding to the operation of retracting the landing gear;

FIG. 5 represents the condition corresponding to the operation for altering the trim of the aircraft;

FIG. 6 represents the condition corresponding to the operation for restoring the aircraft to its normal position for running along the ground;

FIG. 7 represents the condition in which, after completion of this operation, the shock-absorber is ready to resume its normal function.

Figure 1:
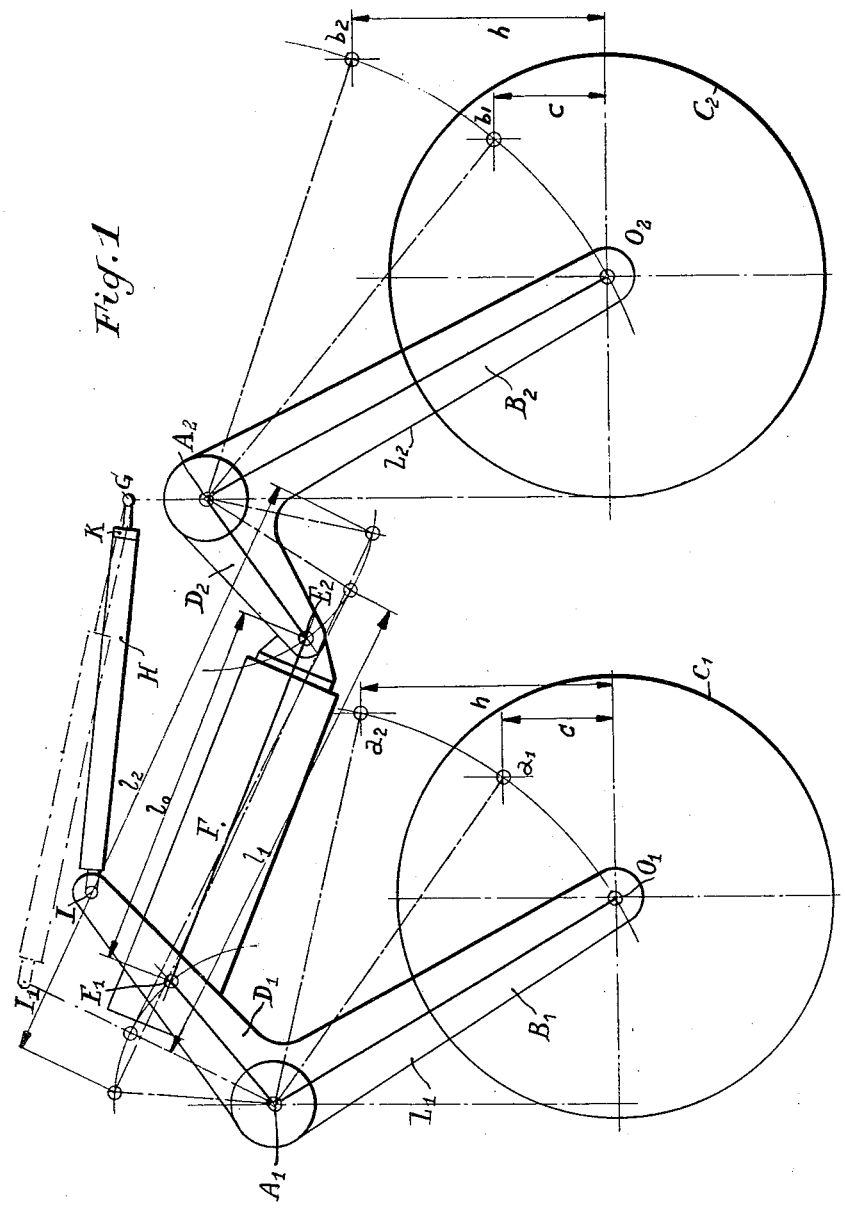

Reference being made to FIG. 1, it will be assumed in the text which follows that the shock-absorber function is carried out for example over the travel $c$ corresponding to a tractive effort on the shock-absorber, the length of which changes from $l_0$ to $l_1$ The full lifting action of the landing gear corresponds to the distance of travel $h$ and to the extension of the jack shock-absorber from the length $l_0$ to length $l_2$.

In order to carry out the third function of trim alteration, the length of the shock-absorber will be made to vary from $l_0$ to a value which may reach a maximum of $l_2$ by producing an extension in order to lower the aircraft. This extension will subsequently be followed by a retraction so as to restore the aircraft to its position for running along the ground.

Figure 2:
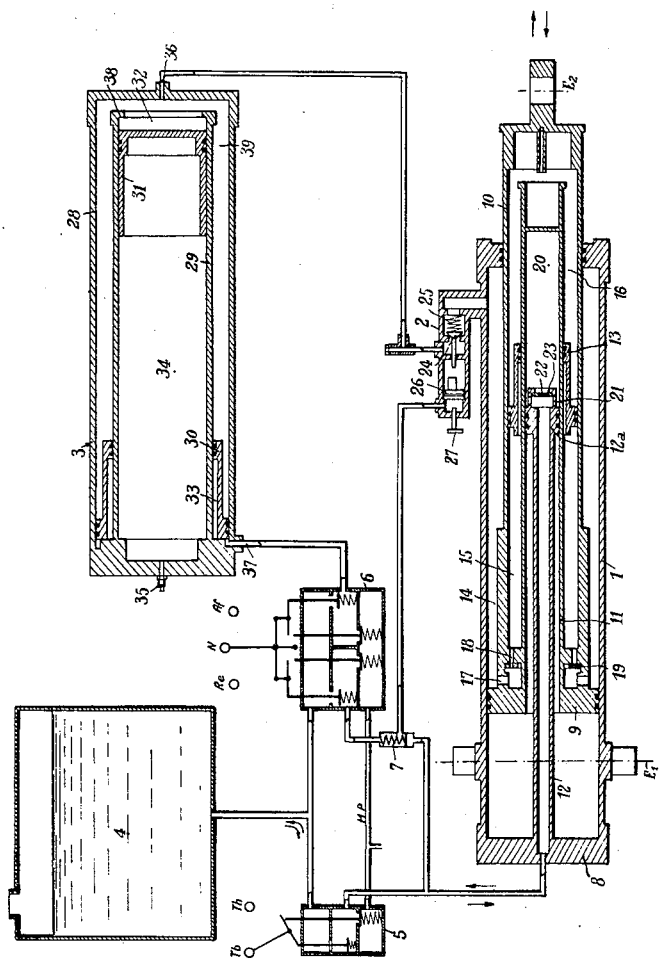
FIG. 2 represents the condition of the apparatus corresponding to the aircraft on the ground, the pressures due to weight-loads being balanced by the shock-absorber.

The device shown in FIG. 2 carries out these different functions, as will be explained below:

FIG. 2 represents the device in the position of the aircraft on the ground, the pressure due to the weight-loads being balanced by the shock-absorber.

The assembly is essentially composed of the following elements:

Jack shock-absorber 1 provided with a controlled valve 2;
Cylinder or recuperator 3 comprising two casings and two pistons;
Tank 4 for liquid to be put under pressure (for example by gas pressure);
Lifting distributor 5;
Distributor 6 for alteration of trim;
Shuttle-valve 7.

In order to simplify further description, separate consideration will first be given to each element mentioned above.

1. JACK SHOCK-ABSORBER

Jack shock-absorber 1 corresponds to the shock-absorber shown at F in FIG. 1. It is essentially composed of a cylinder 8 in which moves a piston 9 rigidly fixed to the rod 10. This rod carries a second cylinder 11 in which moves a rod 12 provided with a piston 12a.

An annular separator-piston 13 serves as a separation between the annular chambers 14 and 15 containing oil, and the chamber 16 containing air providing for suspension. It may be seen that when the rod 10 is pulled outwardly relative to the cylinder 8, oil is caused to pass from the chamber 14 into the chamber 15 through the ports 17 and 18, these latter being controlled by a valve 19 regulating the hydraulic braking pressure.

In this movement, the separator piston 13 is displaced and compresses the air in the chamber 16, thus balancing the final load reached in the shock-absorber. This shock-absorber is a device of a standard type.

In the movement of extension of the shock-absorber the chamber 20 containing oil increases in volume, consequently producing suction of the liquid from the tank 4 through the ports 21 and 22.

When the load is released and the shock-absorber is shortened under the effect of the pressure of air, the valve 19 is displaced and permits the free supply of the chamber 14. On the other hand, the volume of the chamber 20 has a tendency to be reduced, thus producing a circulation of liquid towards the tank 4 through the port 22 of the valve 23 which shuts off at this moment the large ports 21 and thus produces forcing of the oil through the orifice 22. This forcing action effects the hydraulic braking of the movement of shortening of the jack.

To sum up, the jack shock-absorber as described carries out the balancing of the forces to which it is subjected (suspension) and the hydraulic braking of the movements of extension and of shortening. It operates as a double-acting shock-absorber.

2. CONTROLLED VALVE

Valve 2 is intended to isolate the oil chamber 14 of the jack shock-absorber 1 from the circuit terminating at the cylinder 3. For this purpose it is essentially constituted by a non-return valve 24; this valve being on the one hand kept closed by a spring 25 and capable on the other hand of being opened by the action of the piston 26 controlled hydraulically by the set of distributors 6 or 7, as will be described below.

The piston 26 can also be controlled manually by a push-rod 27 when carrying out testing or filling operations.

3. CYLINDER

Cylinder 3 consists of an external casing 28 and an internal casing 29, of two pistons 30 and 31, thus forming three chambers; a first oil chamber 32, a second oil chamber 33 coupled to the hydraulic circuit, and an air chamber 34 charged to low pressure through a valve 35.

The cylinder comprises two ports 36 and 37 which respectively put said cylinder into communication with the jack shock-absorber on the one hand and with the distributor 6 for altering the trim on the other hand.

4. HYDRAULIC TANK

Tank 4 has no distinctive characteristics.

5. LIFTING DISTRIBUTOR

Distributor 5 has two positions but no special feature.

6. DISTRIBUTOR FOR THE ALTERATION OF TRIM

Distributor 6 has three positions but does not have any special features.

The lower compartment of these two distributors is connected to an oil-pressure conduit HP.

7. SHUTTLE VALVE

Shuttle valve 7 permits of the operation of the piston 26 of the controlled valve 2, either by the distributor 5 or by the distributor 6. It does not have any distinctive features.

The above summary being concluded, a description now follows with respect to the operation of the assembly in its various possible positions.

I. *Position With Undercarriage Lowered, Aircraft in Flight—FIG. 3*

In this case, the distributor 5 is in the "undercarriage-down" position T*b*; the distributor 6 is in the neutral position N.

Under these conditions, all the circuits are returned to the tank 4, the controlled valve 2 isolates the jack shock-absorber, the piston 31 takes up a position in proximity to the abutment 38. The piston 30 is against its stop. The shock-absorber is thus ready to operate, that is to say the movements of extension and contraction of the shock-absorber under the action of external forces are braked hydraulically. In addition, the shock-absorber is capable of balancing an external tractive load. For example, it can occupy the position shown in FIG. 2 under the action of the weight of the aircraft while running on the ground.

II. *Raising the Undercarriage*

As shown in FIG. 1, the lifting corresponds to the complete extension of the shock-absorber, the operation being shown in detail in FIG. 4. The operation is carried out in the following manner:

The distributor 5 is set to the position "Undercarriage Up" T*h*, thus putting the chamber 20 of the jack shock-absorber into communication with the high-pressure source or circuit HP, this operation having a tendency to extend the shock-absorber. At the same time, the distributor 5 has thrust back the slide-valve of the shuttle-valve 7 thus admitting the oil supply to the controlled valve 2 and raising the valve 24 through the intermediary of the control piston 26. In the movement of extension of the shock-absorber, the liquid of the chambers 14 and 15 of the jack shock-absorber is introduced into the chamber 32 of the cylinder 3, thus withdrawing the piston from the abutment 38. In the course of this operation, the air chamber 34 of the cylinder 3 is reduced and the air pressure is increased without however exceeding that of the chamber 16 of the shock-absorber, thus allowing the piston 13 to remain against its stop. It is quite obvious that the section of the piston 12*a* should be so calculated as to provide an adequate effort for raising the undercarriage. It is to be observed that by carrying out the raising operation in this manner, it is possible to provide the piston 12*a* with the most precise dimensions, thus enabling the lifting operation to be carried out with optimum efficiency (with the lowest possible consumption of energy).

III. *Lowering of the Undercarriage*

This is the reverse operation with respect to the preceding; it is carried out by setting the distributor 5 in the position "Undercarriage Down" T*b*, and it restores the system to the position of FIG. 3 due to the air pressure of the chamber 34 which forces back the oil of the chamber 32 of the cylinder 3 towards the chambers 14 and 15 of the jack shock-absorber 1 by lifting the valve 24 of the controlled valve 2.

IV. *Operation of Alteration of Trim*

After landing, the shock-absorber is brought back into the position defined by FIG. 2. Starting from this position, it should be possible to lower the deck of the aircraft so as to place it at a level with a loading ramp for example. For this purpose, the trim-changing distributor 6 must be placed in its lowering position A*f*, as shown in FIG. 5.

In this position, the high pressure acts on the piston 26 of the controlled valve 2 and opens the valve 24. The liquid of the chambers 14 and 15 of the jack shock-absorber is forced into the chamber 32 of the cylinder 3 by the action of extension of the shock-absorber produced by the weight of the aircraft. In the position corresponding to the maximum lowering (see FIG. 1), the shock-absorber is completely extended, the piston 13 of the shock-absorber reaches its stop under the action of the air pressure of the chamber 16 and the piston 31 of the cylinder also butts against its stop. It is to be noted that at any moment in course of lowering, the operation may be stopped at any position by returning the distributor 6 to the "neutral" position N; the valve 24 of the controlled valve 2 being caused to close, the liquid of the chambers 14 and 15 can no longer be evacuated into the chamber 32 of the cylinder 3 and the shock-absorber therefore remains in this intermediate position.

V. *Restoration of the Aircraft to Its Normal Ground Running Position (Aircraft Ready to Take Off, For Example)*

For this operation, it is necessary to operate the trim-changing distributor 6 by putting it in the "raise" position R*e*, as shown in FIG. 6.

In this position, the high pressure is sent to the chamber 33 of the cylinder 3, which has the effect of displacing the piston 30 by compressing the liquid of the chamber 39 which in its turn is introduced in the chambers 14 and 15 of the jack shock-absorber 1, by raising the valve 24 of the controlled valve 2. When the piston 30 reaches the stop 38, the quantity of oil which has entered the shock-absorber is equal to the quantity which initially left the shock-absorber at the time of lowering, when the piston 30 is moved up to this stop, the shock-absorber is thus at this moment in a position which is identical to that shown in particular in FIG. 2.

The shock-absorber is therefore again ready to operate normally (hydraulic braking and suspension). At the end of this operation, the trim-changing distributor 6 should be restored to its neutral position N, thus enabling (as explained with reference to FIG. 7), the piston 31 of the cylinder 3 to force the oil from the chamber 32 towards the chamber 39 under the action of the air of the chamber 34 while the oil of the chamber 33 returns to the tank.

The displacement of the pistons being completed, the whole of the circuit returns to a position which corresponds to the running of the aircraft on the ground, such as defined by FIG. 2.

It should also be noted that the raising operation may be stopped at any moment before reaching the complete return of the aircraft to its normal trim by bringing the trim-changing distributor lever back from the "raise" position R*e* to the "neutral" position N. Since the chamber 33 is thus no longer supplied with oil under pressure, the shock-absorber stops in an intermediate position.

The device described above provides a simple means of carrying out the most complex functions required of a shock-absorber, namely:

Operation as a standard shock-absorber;
Operation as a lifting-jack;
Operation as a device for the alteration of trim.

This device has the following main advantages:

(1) Mechanical simplicity resulting in simple kinematic movements, for example in the form of construction of the landing gear shown in FIG. 1, in which a single shock-absorber controls the movements of two wheel-trains;

(2) The jack shock-absorber enables the undercarriage raising operation to be carried out with the minimum expenditure of energy and without the assistance of supplementary mechanisms;

(3) The transfer of liquid into the air-inflated cylinder has the immediate consequence of enabling the undercarriage to be lowered without addition of energy, merely by making use of the expansion of air in the cylinder;

(4) The special arrangements of the cylinder 3 enable the oil to be conveyed from the shock-absorber to the said cylinder at a high pressure, thus creating substantial forces enabling the aircraft to be lifted; this result being obtained by displacement of an annular piston under the action of the high pressure.

(5) The arrangements of the whole of the hydraulic circuit provide an effective division between the functions of "lifting" and "trim changing," and this enables the lifting distributor to be placed for example within reach of the pilot, and the trim-changing distributor to be placed within reach of the mechanic.

(6) The safety of operation of the shock-absorber is fully ensured by the very fact that it is not necessary to apply the high pressure to restore the shock-absorber to its "Undercarriage Down" position, that is to say when the aircraft is ready to land. In order to obtain this position, the whole circuit is, in fact, returned to the tank.

What I claim is:

1. A landing gear system comprising a landing gear for an aircraft adapted to support the same on the ground, a jack shock-absorber coupled to the landing gear for controlling the operation thereof, the jack shock-absorber having a first oil chamber the volume of which varies due to the effect of shocks transmitted to the shock-absorber by the landing gear, a tank adapted to receive from said chamber and return to said chamber oil displaced by said volume variations, a high pressure hydraulic source, first valve means selectively connecting said chamber to said tank and said high pressure source, said shock-absorber further having a second oil chamber deformable under the effect of said shocks, and a compressed air chamber the volume of which varies with the deformations of said first and second chambers; a recuperator, second valve means for selectively isolating and coupling said second chamber and said recuperator, said jack shock-absorber being operatively connected to the landing gear to cause raising and lowering of the aircraft thereby in accordance with the quantity of oil in the second chamber of the shock absorber, said recuperator being adapted for storing oil coming from the second oil chamber of the shock-absorber whereby the level of the aircraft is lowered, and third valve means for selectively coupling said recuperator to said source to force oil into the second chamber of the shock-absorber to raise the level of the aircraft.

2. A device according to claim 1, in which said recuperator comprises a cylindrical tank, a cylinder disposed coaxially within the tank and open at one of its ends, and a piston movable in said cylinder; said cylinder and said piston defining a chamber for compressed air, the volume of which decreases and increases at the same time as does the volume of oil in the second oil chamber of the shock-absorber.

3. A device according to claim 2 wherein an annular space is defined between said cylindrical tank and said cylinder, comprising a free piston in said annular space separating said inner cylinder into two chambers, the first one of which communicates with the cylinder, said third valve means selectively connecting the second of said chambers with the tank and with said source, depending on whether the level of the deck of the aircraft is to be lowered or raised.

4. A device according to claim 3 wherein said second valve means comprises a cylinder, a piston movable in the latter said cylinder, a shuttle valve connected to the latter said cylinder and operated by the latter said piston, a spring loading the latter said cylinder, the latter said cylinder being connected to the first valve means and to the third valve means, control means coupled to and controlling the third valve means so that said source is coupled by said third valve means to the latter said cylinder when the recuperator is connected to the first said tank and so that the latter said cylinder is connected through the third valve means to the first said tank when the recuperator is connected to said source.

5. A landing gear system for aircraft comprising a landing gear coupled to said aircraft for supporting the same on the ground, a tank of pressure fluid, a source of high pressure medium, shock-absorber means coupled to the landing gear permitting relative movement between the landing gear and the aircraft to enable raising and lowering of the aircraft with respect to the ground, a first distributor selectively coupling said means to said tank and source, a control valve coupled to said means, a second distributor coupling said means to said tank and source, a shuttle valve coupling said first and second distributors to said control valve for controlling the same, and a recuperator coupled via said control valve to said means and via said second distributor to said tank whereby said means is selectively subjected to pressure, the landing gear being moved in accordance with the pressure in said means to control raising and lowering of said aircraft.

References Cited in the file of this patent

UNITED STATES PATENTS

| | | |
|---|---|---|
| 1,768,696 | Laddon | July 1, 1930 |
| 2,130,914 | Warren | Sept. 20, 1938 |
| 2,492,765 | Porath | Dec. 27, 1949 |
| 2,554,581 | Levy | May 29, 1951 |
| 2,937,034 | Langen | May 17, 1960 |

FOREIGN PATENTS

| | | |
|---|---|---|
| 1,037,210 | France | Apr. 29, 1953 |